United States Patent
Cheng et al.

(10) Patent No.: US 7,854,173 B2
(45) Date of Patent: Dec. 21, 2010

(54) STRAIN SENSOR

(75) Inventors: Ching-Hsiang Cheng, Hong Kong (HK); Chen Chao, Hong Kong (HK); Yun Zhu, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 146 days.

(21) Appl. No.: 12/325,129

(22) Filed: Nov. 28, 2008

(65) Prior Publication Data

US 2010/0132476 A1    Jun. 3, 2010

(51) Int. Cl.
*G01B 7/16* (2006.01)
(52) U.S. Cl. .......................................... 73/774; 73/760
(58) Field of Classification Search ........... 73/760–774, 73/777
See application file for complete search history.

(56) References Cited

U.S. PATENT DOCUMENTS

| | | | |
|---|---|---|---|
| 3,719,913 A | | 3/1973 | DuBose et al. |
| 3,803,485 A | * | 4/1974 | Crites et al. ................. 324/693 |
| 4,506,250 A | | 3/1985 | Kirby |
| 4,708,019 A | | 11/1987 | Rubner et al. |
| 5,767,413 A | * | 6/1998 | Dombrowski et al. ......... 73/774 |
| 6,664,006 B1 | * | 12/2003 | Munshi ...................... 429/305 |
| 7,500,399 B2 | * | 3/2009 | Cheng et al. .................. 73/777 |
| 7,649,595 B2 | * | 1/2010 | Masutani et al. .............. 349/89 |
| 2004/0056673 A1 | * | 3/2004 | Cram ........................ 324/754 |

* cited by examiner

*Primary Examiner*—Max Noori
(74) *Attorney, Agent, or Firm*—Muncy, Geissler, Olds & Lowe, PLLC

(57) ABSTRACT

A strain sensor (10) for measuring strain greater than 10%, the sensor (10) comprising: an upper polydimethylsiloxane (PDMS) substrate (20) having measurement electrodes (90) extending therethrough; a lower PDMS substrate (30) bonded to a lower surface of the upper PDMS substrate (20), and an upper surface of the lower PDMS substrate (30) having a patterned portion (50); and a conductive fluid (70) contained within the patterned portion (50) in contact with the measurement electrodes (90).

18 Claims, 8 Drawing Sheets

STRAIN SENSOR

TECHNICAL FIELD

The invention concerns a strain sensor for measuring strain greater than 10% and a method for manufacturing the strain sensor.

BACKGROUND OF THE INVENTION

A traditional metal wire strain gauge or foil type strain gauge is limited in measuring large strain since they typically only measure strain up to around several percent. For example, platinum-8% tungsten has the strain range of about ±0.3%. A copper-nickel alloy has the strain range of up to ±5%.

A strain sensor made of commercial fabrics coated by a conductive polymer is able to detect a large strain deformation; however, the repeatability and reliability is limited. After frequent usage, the performance of this strain sensor reduces gradually due to the poor mechanical properties of the polymer, the aging of polymer and reduction of adhesion, especially in cyclic deformation.

A salt water based strain sensor is able to measure large strain and has no aging problem. However, the evaporation of water and the corrosion of the electrodes are significant problems encountered.

Mercury based strain sensors are able to measure large strain. However, the use of mercury is not environmentally friendly.

Accordingly, there is a desire for a strain sensor that ameliorates at least some of the problems identified with prior art strain gauges outlined above.

SUMMARY OF THE INVENTION

In a first preferred aspect, there is provided a strain sensor for measuring strain greater than 10%, the sensor comprising:
  an upper polydimethylsiloxane (PDMS) substrate having measurement electrodes extending therethrough;
  a lower PDMS substrate bonded to a lower surface of the upper PDMS substrate, and an upper surface of the lower PDMS substrate having a patterned portion; and
  a conductive fluid contained within the patterned portion in contact with the measurement electrodes.

The conductive fluid may be a room temperature ionic liquid for use as a piezoresistive gauge material or a eutectic alloy comprising at least gallium and indium.

The sensor may further comprise a casing made from polymers or elastomers

The casing may be made from PDMS.

The measurement electrodes may be carbon nanotubes doped PDMS

The carbon nanotubes may be multiwalled.

The measurement electrodes may be lacquered wires or carbon fibers.

The PDMS substrates may be bonded to each other after an oxygen plasma treatment is applied on the PDMS substrates.

In a second aspect, there is provided a method for manufacturing a strain sensor for measuring strain greater than 10%, the method comprising:
  bonding an upper polydimethylsiloxane (PDMS) to a lower PDMS substrate;
  injecting a conductive fluid via holes in the upper PDMS substrate to be contained in a patterned portion of the lower PDMS substrate; and
  filling the holes in the upper PDMS substrate with measurement electrodes that are in contact with the conductive fluid.

The conductive fluid may be a room temperature ionic liquid.

The holes may be sealed with carbon nanotube doped PDMS to form the measurement electrodes.

Lacquered wires or carbon fibers may be inserted in the holes to form the measurement electrodes.

The method may further comprise the initial step of punching the two holes through the upper PDMS substrate.

The method may further comprise the initial step of inserting two metal molds to form the holes of the upper PDMS substrate through which the conductive fluid is injected.

The method may further comprise the initial step of patterning the lower PDMS substrate using an SU-8 channel mold to form the patterned portion for containing the conductive fluid.

The method may further comprise the initial step of applying an oxygen plasma treatment to the PDMS substrates prior to bonding them together.

BRIEF DESCRIPTION OF THE DRAWINGS

An example of the invention will now be described with reference to the accompanying drawings, in which.

DETAILED DESCRIPTION OF THE DRAWINGS

Figure 1:
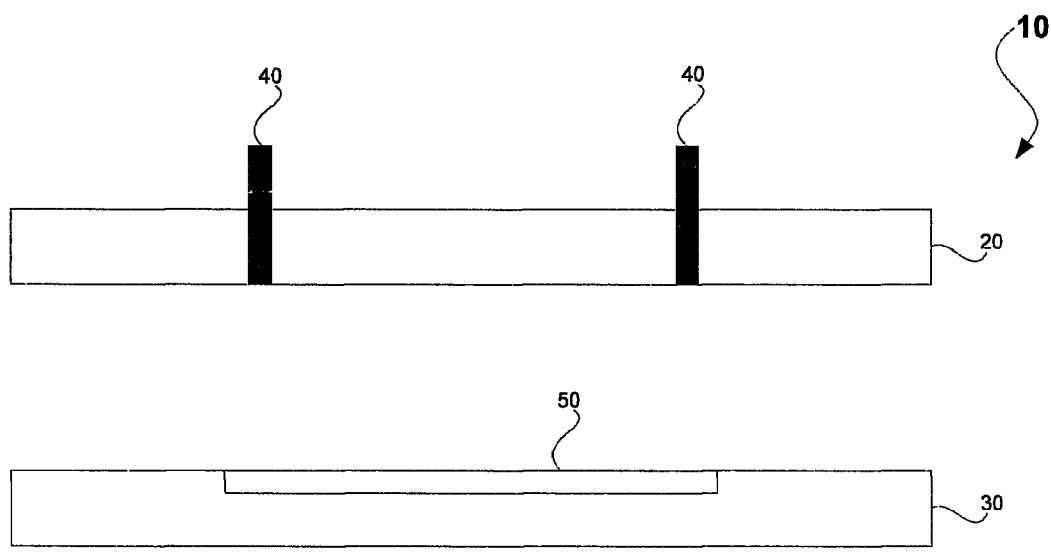
FIG. 1 is a side view of preparing two PDMS substrates for manufacturing a strain sensor in accordance with a preferred embodiment of the present invention.

Referring to the drawings, a strain sensor 10 for measuring strain greater than 10% is provided. The sensor 10 generally comprises: two polydimethylsiloxane (PDMS) substrates 20, 30 and a conductive fluid 70. The two PDMS substrates include an upper polydimethylsiloxane (PDMS) substrate 20 having measurement electrodes 90 extending therethrough and a lower PDMS substrate 30 bonded to a lower surface of the upper PDMS substrate 20. An upper surface of the lower PDMS substrate 30 has a patterned portion 50. The conductive fluid 70 is contained within the patterned portion 50 which is in contact with the measurement electrodes 90.

Figure 9:
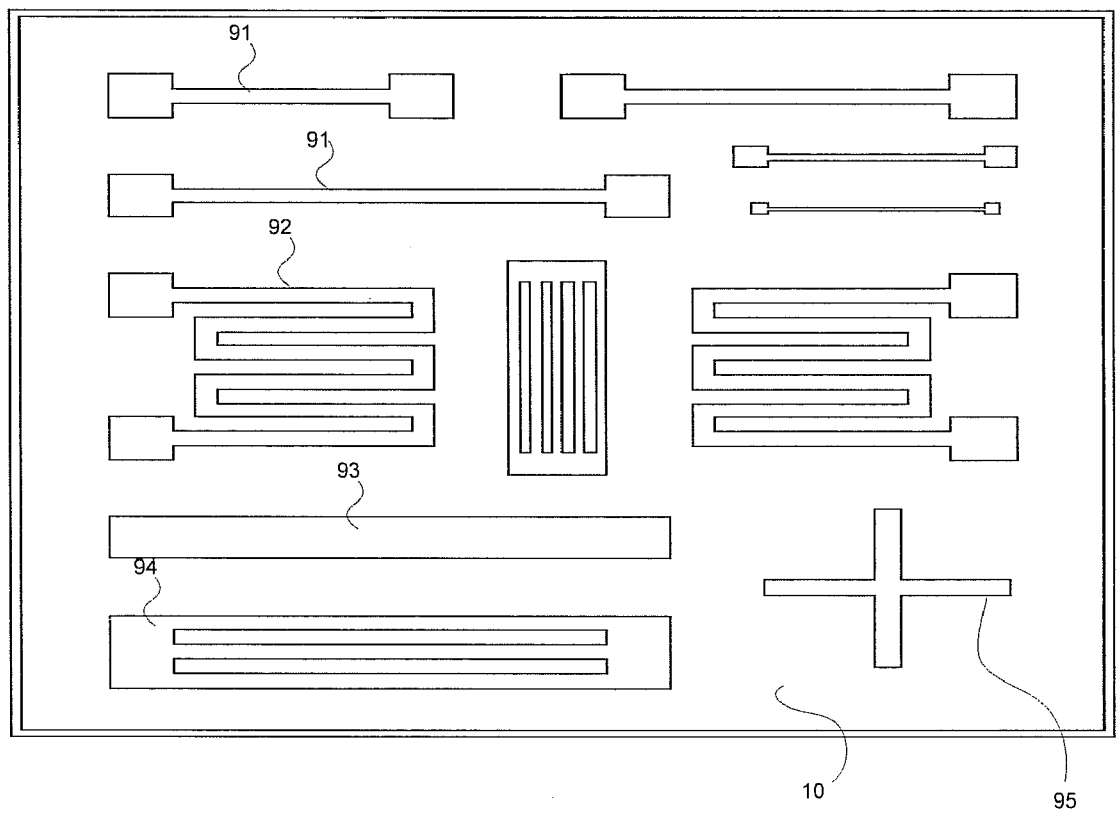
FIG. 9 is an image of a mask for patterning a channel to contain the conductive liquid of a strain sensor according to an embodiment of the present invention.

Preferably, the conductive fluid is a room temperature ionic liquid 70 because it is highly advantageous. The ionic liquid 70 is used as the piezoresistive gauge material in the strain sensor 10. The ionic liquid 70 has excellent properties including: good electrical conductivity, "zero" vapor pressure, low viscosity coefficient, good thermal and chemical stability, and wide temperature range, etc. The liquid gauge material can measure strain over 55%. The ionic liquid based strain sensor 10 is environmentally friendly compared to a mercury based strain sensor 10 because no mercury or heavy toxic metals are required. Ionic liquid 70 almost does not volatilize over a wide temperature range therefore as compared to a salt water based strain sensor 10, it is persistently usable with no liquid gauge material consumption. Ionic liquid 70 has a higher potential window, from 4 to 6 volts, depending on its species, and therefore has a wide working voltage range. The refraction index of ionic liquid 70 (i.e. 1.42) is close to that of the PDMS substrates 20, 30 (i.e. 1.4), the patterned channel 50 become invisible after the injection of the ionic liquid 70 as shown in FIG. 9. It has potential use in the research of invisible devices and optical devices.

The measurement electrodes 90 may be prepared by two modes. One uses PDMS mixed with MWCNTs (multiwalled carbon nanotubes) as flexible electrodes. The other uses traditional lacquered wires 88 or carbon fibers (see FIG. 10). In one embodiment, CNTs doped PDMS are used in the strain sensor 10 as the measurement electrodes 90. The mixture shows good conductivity when the percentage by weight of CNTs is over 8%. This flexible electrode 90 can seal up the conductive channel 50 very well and it combines with the PDMS substrate 20 closely under large strain. Use of such an electrode 90 solves the flaking off or sliding off problem in connecting point as compared to a metal electrode/PDMS substrate system. Furthermore, a mixture of CNT and PDMS is anticorrosive and is highly suitable for an electrode material. This flexible electrode 90 provides a broad application if its resistivity is reduced correspondingly. A carbon fiber electrode 90 combines the benefits of above two electrode materials because it has a good conductivity and is anticorrosive.

The casing of the strain sensor 10 can be made of polymers or elastomers so as to achieve a large strain. In one embodiment, the piezoresistive strain sensor 10 is used for large strain measurement in which the true strain, $\epsilon=\ln(L/L_0)$, ($L_0$ is the original length and L is the final length of the sensor 10) is measured due to the large deformation. Since the casing is merely a package, aging of the package material is not a problem in the sensor 10. If PDMS is used as the casing, it can be adjusted to different elasticity as demanded by changing the ratio of the PDMS pre-polymer to the curing agent.

Figure 7:
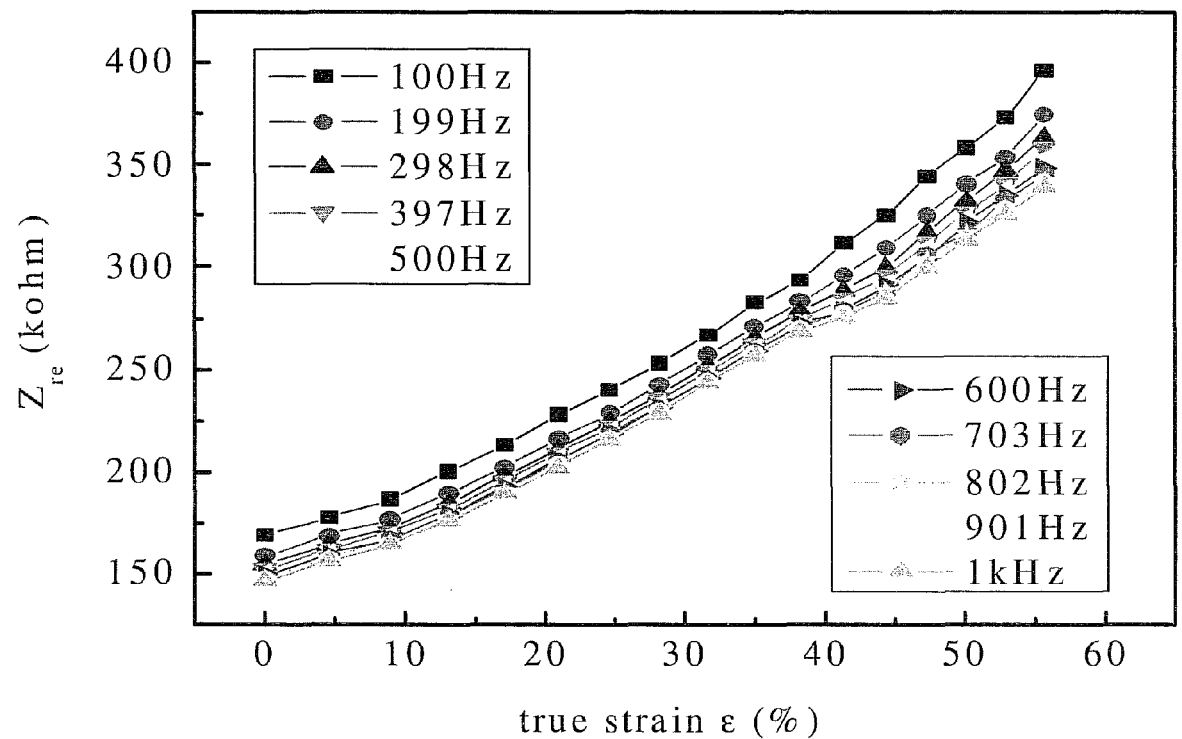
FIG. 7 is a chart showing the relationship between $Z_{re}$ and applied strain, $\epsilon$, of the strain sensor measured at different frequencies.

A detailed microfabrication process for the strain sensor 10 is depicted in FIGS. 1 to 4. Turning to FIG. 1, two pieces of PDMS substrates 20, 30 are prepared. The two pieces of PDMS substrates 20, 30 are 500 μm thick PDMS substrates (Dow Corning Sylgard 184, 1:10 w/w ratio of curing agent to elastomer base, hardened in an oven at 70° C. for an hour). The upper substrate 20 is smooth. Two access holes are punched through the upper substrate 20 for liquid phases and measurement electrodes 90. The punching is performed after curing of the upper PDMS substrate 20. Another technique to form the access holes is to insert two metal molds 40 during solidification of the upper PDMS substrate 20. The lower substrate 30 is patterned using an SU-8 channel mold 50 to form the channel 50 for containing the conductive liquid 70. A channel mold 50 with 50 μm thick features is fabricated using a single step photolithography with SU-8 50 photoresist. Using optical lithography processes, the mold 50 is exposed for 60 seconds under UV light on a mask aligner. A sample of the strain sensor 10 with a single-line microchannel, $13\times1.5\times0.05$ mm$^3$ is measured and the results are shown in FIG. 7.

Figure 2:
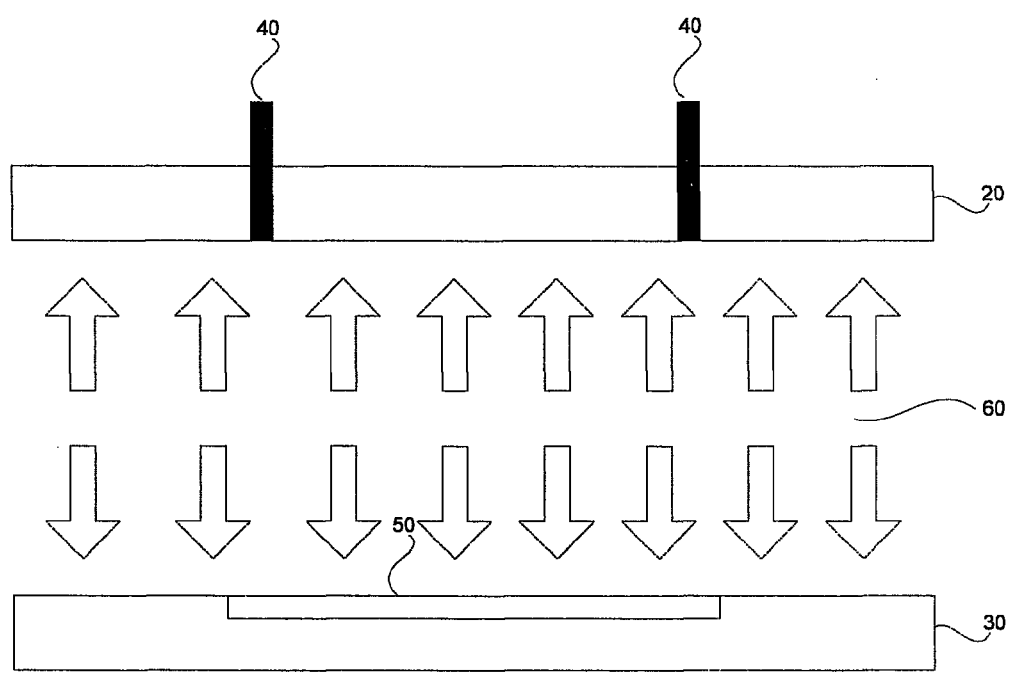
FIG. 2 is a side view of applying an oxygen plasma treatment to the prepared PDMS substrates of FIG. 1.

Referring to FIG. 2, after the PDMS substrates 20, 30 are prepared, oxygen plasma treatment 60 is applied to both PDMS substrates 20, 30.

Figure 3:
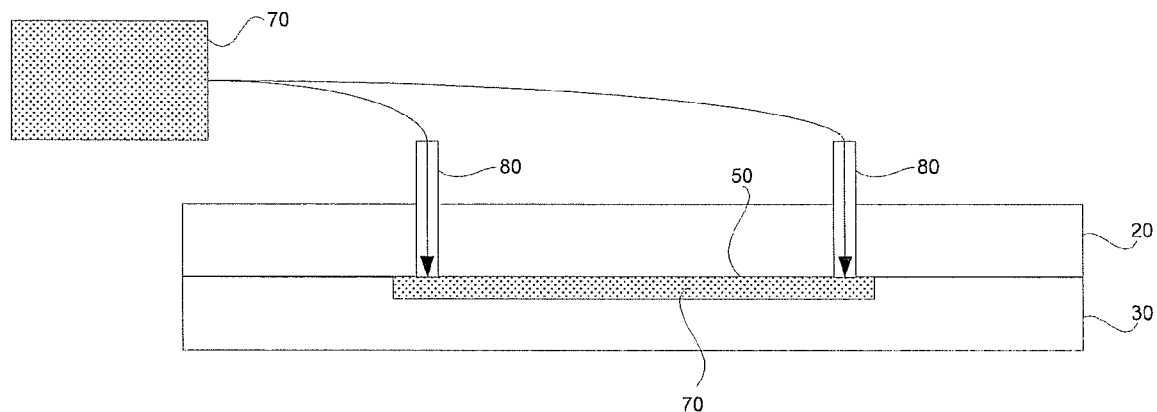
FIG. 3 is a side view of injecting ionic liquid into the bonded PDMS substrates of FIG. 2.

Referring to FIG. 3, the two PDMS substrates 20, 30 are bonded together. The metal molds 40 are removed and two hollow metal tubes 80 are inserted. Ionic liquid 1-butyl-3-methylimidazolium tetrafluoroborate [Bmim][BF$_4$] 70 is injected via the hollow metal tubes 80 to the patterned portion 70 of the lower substrate 30.

Figure 4:
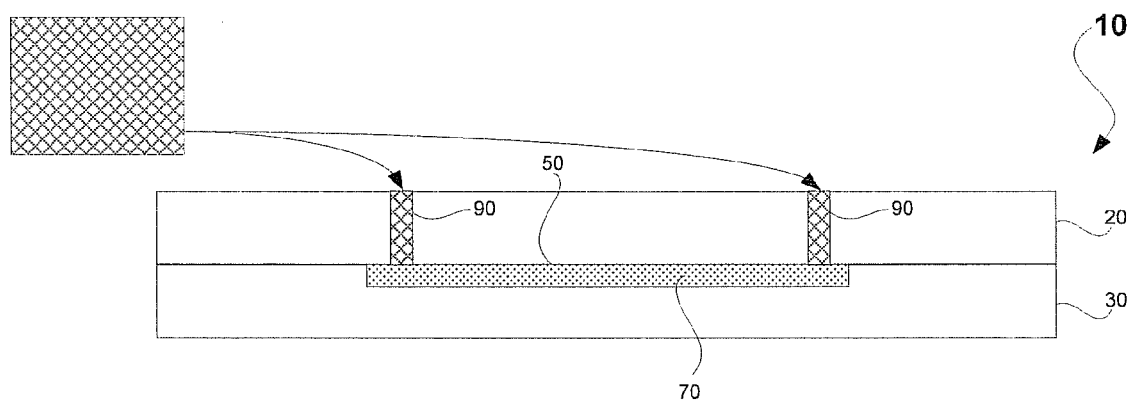
FIG. 4 is a side view of sealing the strain sensor of FIG. 3 with a conductive polymer.

Referring to FIG. 4, the hollow metal tubes 80 are removed. The sensor 10 is sealed with a conductive polymer (carbon nanotube doped PDMS) 90. This fills the voids left by the punched holes or the holes formed by the hollow metal tubes 80 with carbon nanotube doped PDMS 90. The carbon nanotube doped PDMS are the measurement electrodes 90.

In another scenario where the strain sensor 10 using the lacquered wires 88 or carbon fibers as the measurement electrodes 90, the microfabrication process differs by inserting two lacquered wires or carbon fibers in the voids left by the hollow metal tubes 80 and sealing the joint area with instant glue.

Figure 5:
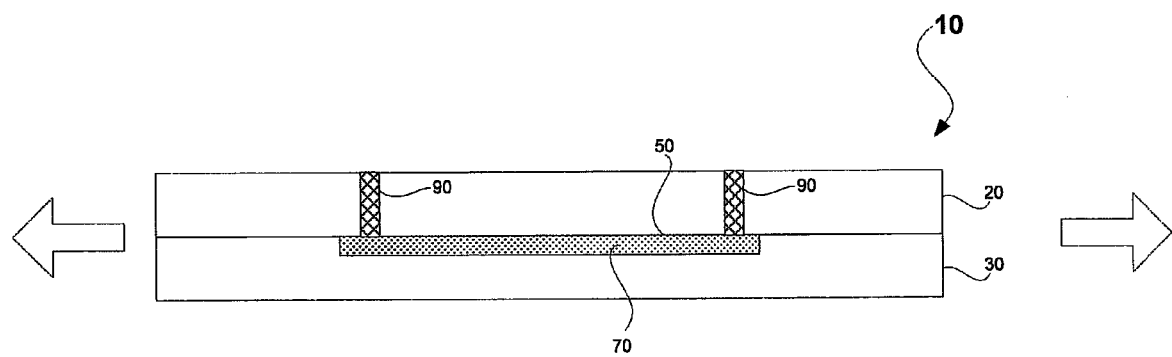
FIG. 5 is a side view of applying tensile deformation in the plane on the strain sensor of FIG. 4.
Figure 6:
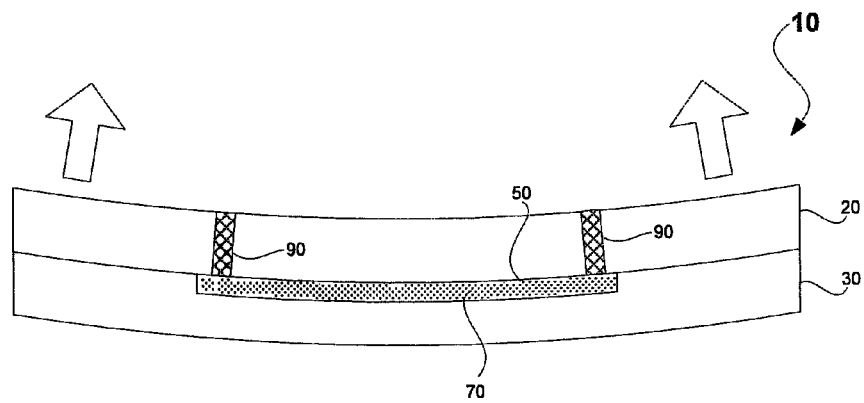
FIG. 6 is a side view of applying bending deformation on the strain sensor of FIG. 4.

Referring to FIGS. 5 and 6, force may be applied (or transferred from the object to the gauge through the interface) onto the fluidic piezoresistive strain sensor 10 at the two ends. The resistance of a confined gauge material of the strain sensor 10 changes upon an applied deformation onto the casing of the strain sensor 10. There are two deformation modes. In FIG. 5, there is tensile deformation in the plane. In FIG. 6, there is bending deformation. The stress transfer mechanism may be through directly applying a tensile force at the two ends of the strain sensor 10; or through interfacial stress transfer by attaching the sensor 10 to the surface of a deforming body.

The result of measurement is shown in FIG. 7 showing the relationship between $Z_{re}$ and applied strain, $\epsilon$, of the strain sensor 10 measured at different frequencies (100 Hz-1 kHz). The variation between the real part of the impedance measured ($Z_{re}$) against strain applied ($\epsilon$) at different applied frequencies for the strain sensor 10 is depicted. In order to reduce the cost of fabrication for more applications, a batch encapsulation method of ionic liquid is envisaged.

Figure 8:
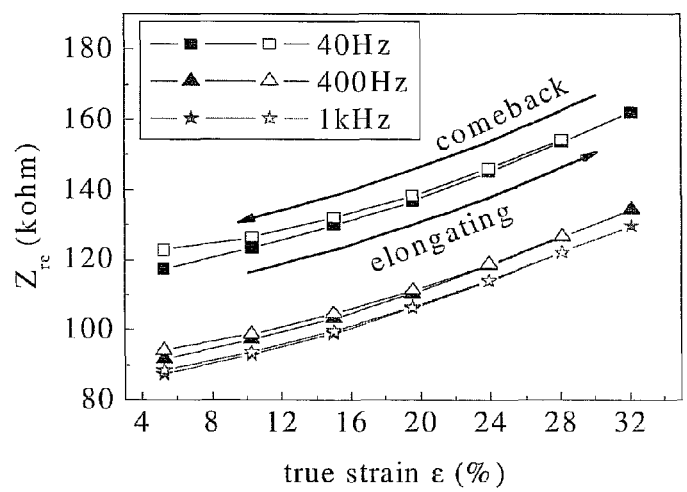
FIG. 8 is a chart showing the results of a cyclic measurement test on the strain sensor.

During a cyclic measurement test, the strain sensor 10 exhibits a good stability and a long operational life. In order to understand the repeatability, loop measurements are made to study its hysteresis. FIG. 8 illustrates the dependence of the real part of the impedance $Z_{re}$ on applied strain $\epsilon$ of the strain sensor 10, the frequency is 40 Hz, 400 Hz, and 1 kHz, respectively, and the applied voltage is 500 mV. The results indicate that the return curve almost superposes with the initial elongation curve after ten times cyclic deformation, except for the tiny offset at low frequency. This offset is coming from the change of polarization resistance caused by ion polarization. When the frequency increases, the effect of ion polarization decreases, and the offset vanishes gradually. No hysteresis was observed under more times cyclic measurements. The good repeatability makes the strain sensor 10 more attractive for practical use.

Referring to FIG. 8, dependence of the real part of the impedance $Z_{re}$ on applied strain $\epsilon$ of the strain sensor 10 at different frequencies 40 Hz, 400 Hz, and 1 kHz, and the applied voltage is 500 mV. The solid symbols show the measurement results with the increase of $\epsilon$. The hollow symbols show the results with the decrease of $\epsilon$ after ten times cycle of elongating and contracting.

Referring to FIG. 9, is an image of a mask for patterning the channel 50 to contain the conductive liquid 70 of a strain sensor 10. There are different shapes and sizes, including dog bone 91, serpentine 92, cross 95, single line 93, multiple lines 94, etc. to fit for different applications. The electrodes 90 are made of PDMS mixed with MWCNTs (multiwalled carbon nanotube). Other embodiments use lacquered wires as the electrodes or carbon fibers as the electrodes. The patterned channel 50 becomes invisible which is due to the close refraction index between the ionic liquid and PDMS substrates 20, 30.

Figure 10:
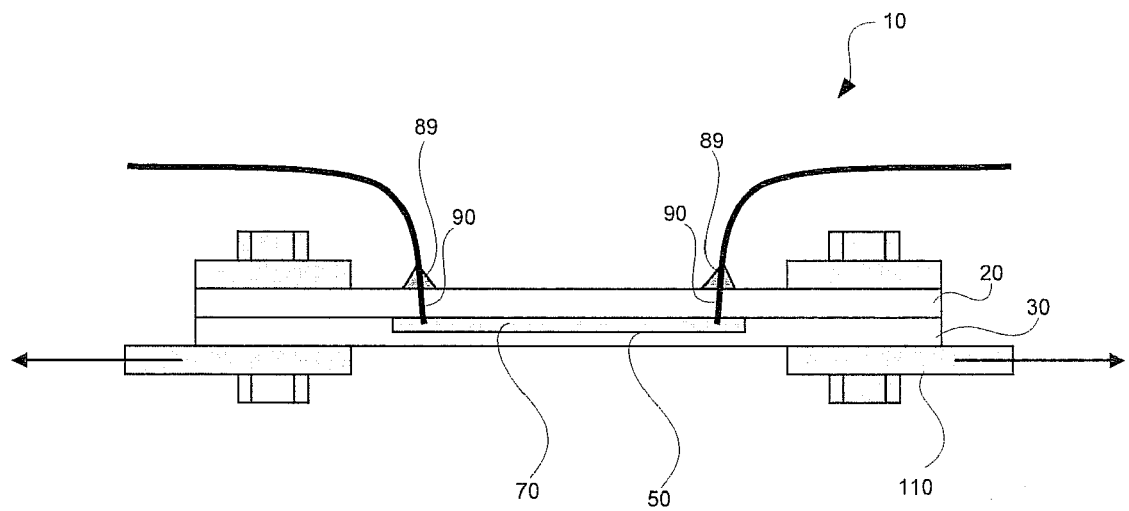
FIG. 10 is a schematic diagram of strain sensor with carbon fiber electrodes.

Referring back to FIGS. 5 and 6, a sample of the strain sensor 10 was made using PDMS as the casing, [Bmim][BF4] as the piezoresistive gauge material, and MWCNT doped PDMS as the electrode. However, lacquered wires (copper and 0.21 mm in diameter) or carbon fibers may be used as the electrode. The weight proportion of the electrode material used (MWCNT:PDMS) is 1:10. Referring to FIG. 10, a sample of the strain sensor 10 having carbon fiber electrodes 90 was tested under increasing strains applied through a moving platform 110 by electrochemical impedance spectroscopy. The corresponding result is shown in FIG. 7. An electrochemical impedance analysis is used for the measurement.

In another embodiment, a liquid metal alloy is used as the conductive liquid 70 instead of ionic liquid. Liquid metal alloy is a suitable material to replace mercury because of its low toxicity to humans and the environment. One such liquid metal alloy is Galinstan™ made by Geratherm Medical AG. Galinstan™ is a eutectic alloy of gallium (Ga), indium (In), and tin (Sn)—(Ga: 68.5%, In: 21.5%, Sn: 10%), which is liquid at room temperature and typically freezes at −19° C. (−2.2° F.). Other suitable liquid metal alloys include: Ga—In (Ga: 75.5%, In: 24.5%), Ga—In—Sn (Ga: 62.5%, In: 21.5%, Sn: 16.0%), or Ga—In—Sn—Zn (Ga: 61%, In: 25%, Sn: 13%, Zn: 1%). Due to the low toxicity and environmentally-friendly nature of its component metals, these liquid metal alloys are a non-toxic replacement for liquid mercury or NaK (sodium-potassium alloy). Composition: 68.5% Ga, 21.5% In, 10% Sn. A liquid metal alloy can be detected using a simple DC circuit, for example a Wheatstone bridge, to measure its pure resistance like measuring a metal wire. However, its resistance is very low similar to the connecting wires 88, so a thin and long serpentine wire pattern needs to be used to increase its resistance, similar to a regular strain gauge. The conductive liquid 70 is patterned 50 so that the sensor 10 is made very small comparable to a conventional solid metal strain gauge. The pattern 50 can also be designed in different shapes for different applications, as the mask layout as depicted in FIG. 9.

However, if ionic liquid 70 is used rather than liquid metal alloy, the resistance of the ionic liquid is much higher than liquid metal alloy so most of the voltage drop will be across the strain sensor 10 without being concerned about the serial resistance from the connecting wires 88. It also consumes much lower power with much less joule heating effect due to its higher resistance. However, the impedance of the ionic liquid 70 needs to be detected using an AC circuit with oscillation frequencies since it is conducted by ions, which contains both resistance and capacitance components in its impedance. Using an AC current can also prevent the formation of electrical double layer on the interface between ionic liquid 70 and contact pads 90 when driven by a DC current.

Figure 11:
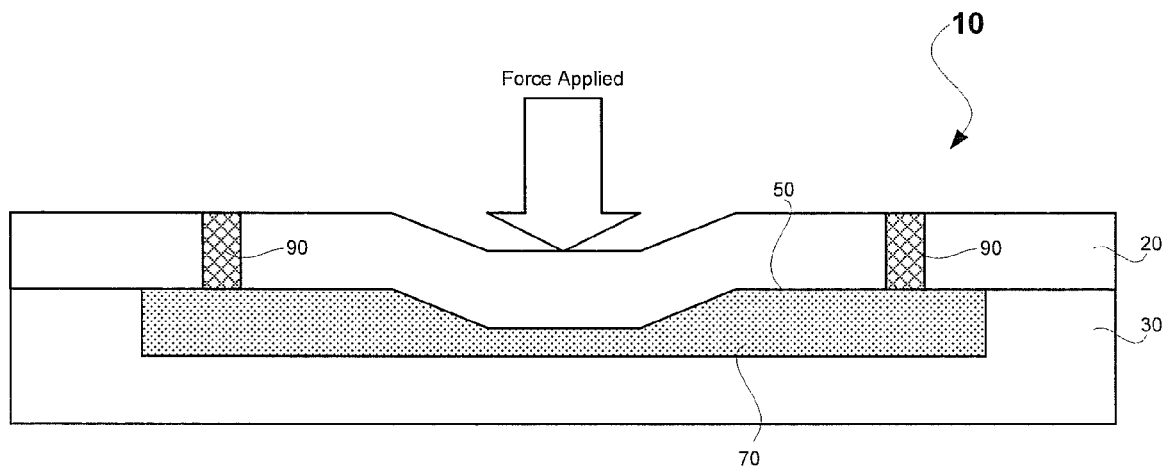
FIG. 11 is a side view of applying a compressive mode across a patterned channel of the strain sensor of FIG. 4.
Figure 12:
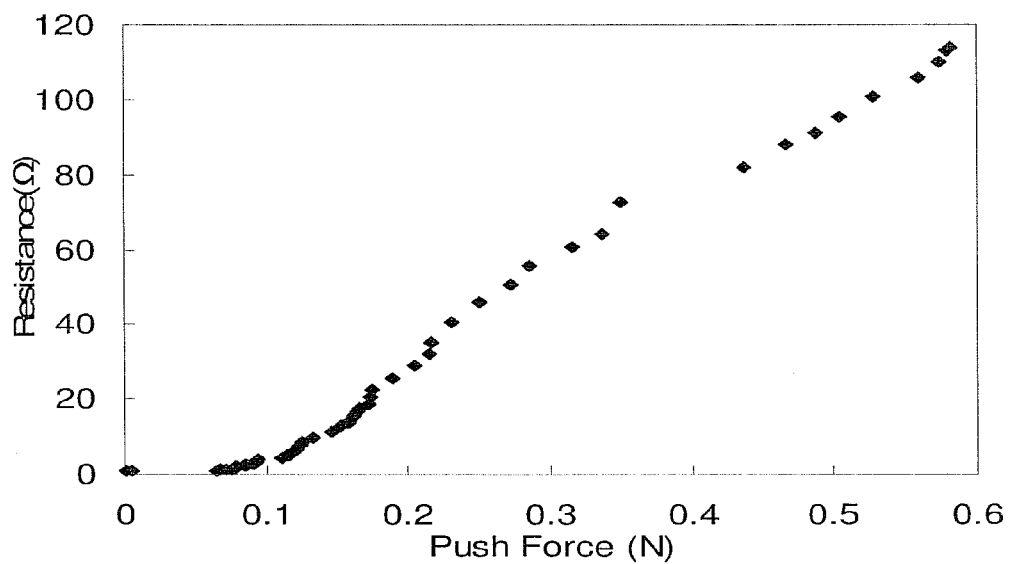
FIG. 12 is a chart illustrating the measurement of resistance versus push force of the strain sensor of FIG. 11.
Figure 13:
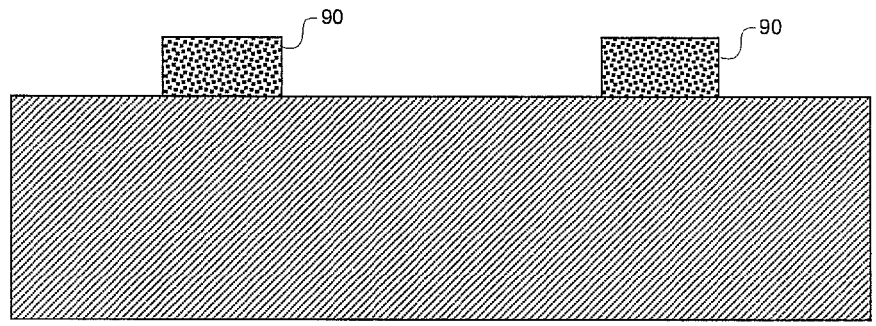
FIG. 13 is a side view of screen printing of a conductive polymer to serve as bond pads for a strain sensor according to an embodiment of the present invention.
Figure 14:
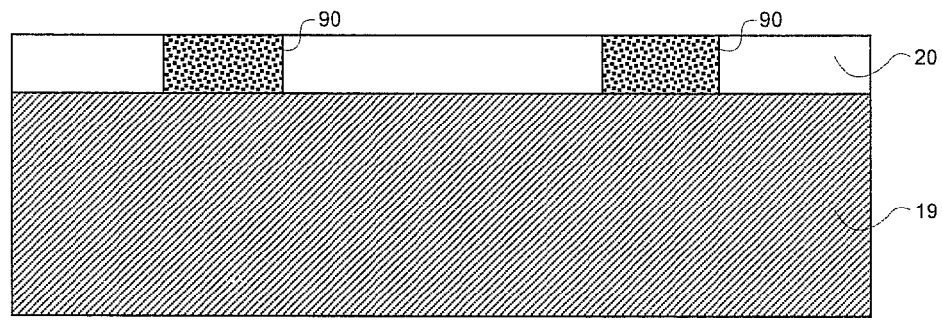
FIG. 14 is a side view of screen printing of a first elastomer to serve as a casing layer for the strain sensor of FIG. 13.
Figure 15:
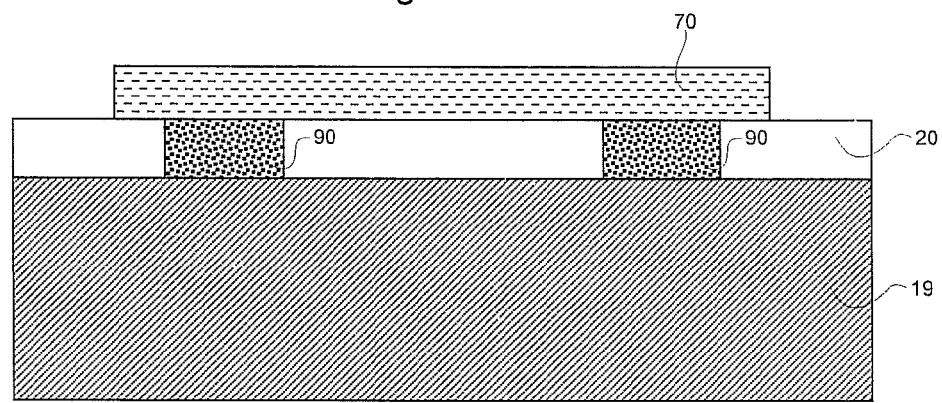
FIG. 15 is a side view of screen printing of a conductive liquid to serve as a sensing material for the strain sensor of FIG. 13.
Figure 16:
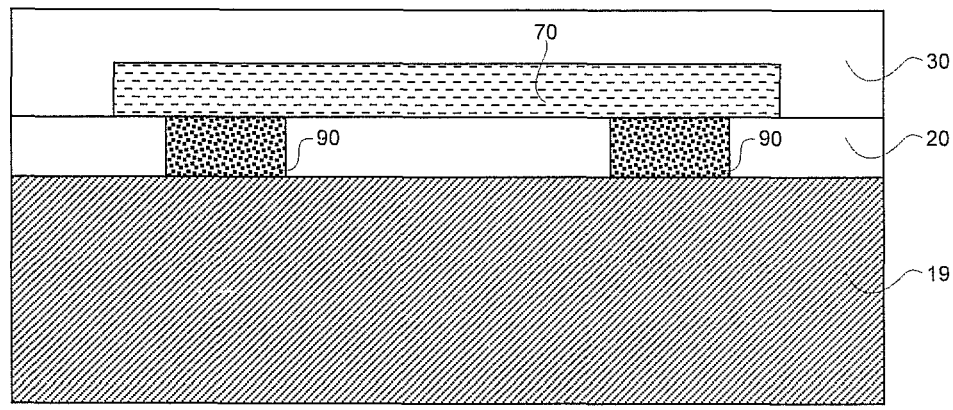
FIG. 16 is a side view of spin coating of a second elastomer to serve as a casing layer for the strain sensor of FIG. 13.
Figure 17:
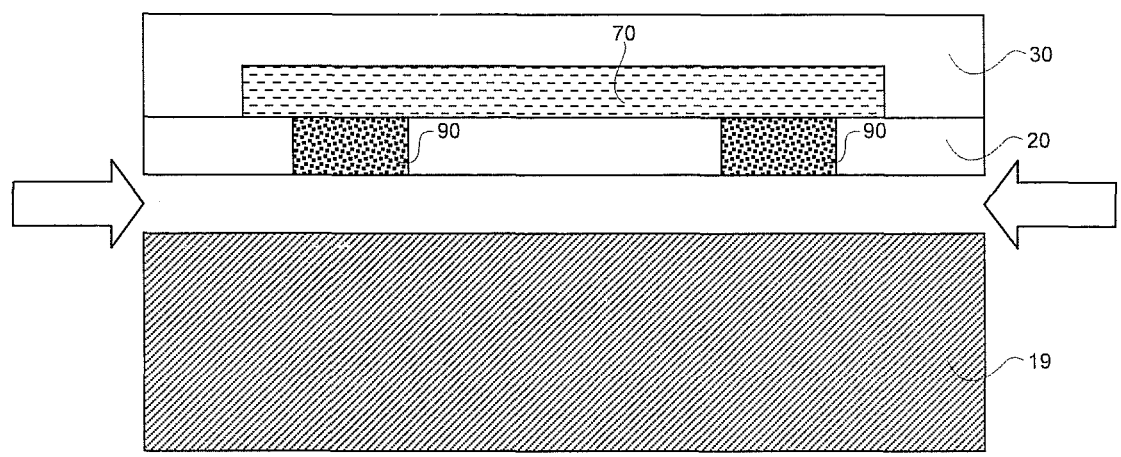
FIG. 17 is a side view of peeling off the encapsulated strain sensor from the substrate to become a finished product.
Figure 18:
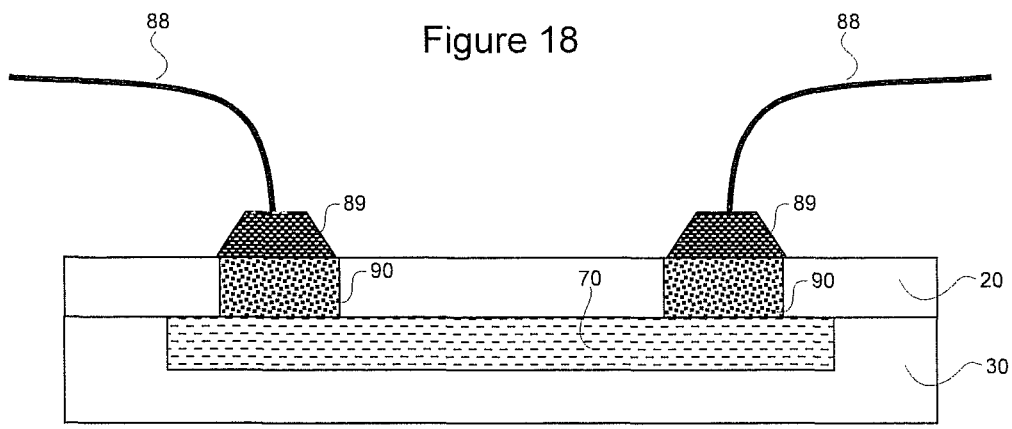
FIG. 18 is a side view of wire bonding to the bond pads using silver paste or epoxy.

Referring to FIGS. 11 and 12, a diagram and a chart of a fabricated prototype of the liquid-metal-alloy strain sensor 10 having force applied on its center is depicted. The force is applied to determine the increase of its resistance. When a compressive strain is applied across the liquid-metal-alloy filled channel 50, it will reduce the cross-sectional area of the channel 50 and therefore increase the resistance of the sensing material 70, which is described by the following equation:

$$R = \rho \frac{L}{A}$$

where R=resistance, ρ=resistivity, L=length, A=cross-sectional area

Referring to FIGS. 13 to 18, a mass production fabrication process is described to batch fill the conductive liquid 70 into an elastomer casing. Firstly, a conductive polymer based on carbon nanotube (CNT) or carbon black (CB) is filled with PDMS and is patterned on the substrate 19 by screen printing followed by curing to solidify the elastomer. Screen printing of the conductive polymer serves as bond pads 90 to later electrically connect the conductive liquid 70 to the bond wires 88. The first elastomer 20 made from PDMS is screen-printed and cured on the substrate 90 leaving openings on the bond pads 90 for electrical connection. Screen printing of the first elastomer 20 serves as a casing layer to encapsulate the liquid conductor 70. The conductive liquid (ionic liquid or liquid metal alloy) 70 is screen printed on the first elastomer casing layer 20 with connection to the bond pads 90. Screen printing of the conductive liquid, for example, ionic liquid or liquid metal alloy 70, serves as the strain sensing material. A second elastomer 30 made from PDMS is spin-coated to cover the liquid conductor 70. This fully encapsulates the strain sensing material 70 and serves as a casing layer. The encapsulated strain sensor 10 is peeled off the substrate 19 to become a finished product. Lastly, bond wires 88 are connected to bond pads 90 using silver paste or epoxy 89 to provide electrical connection to detection circuits.

The strain sensor 10 is useful in measuring large strain, for example, true strain of up to 55%. Stable strain measurement is achieved by using ionic fluid. The strain sensor 10 can be used in biomedical applications for the measurement of tissue deformation. Therefore, it is more competitive for practical application. Moreover, the said sensor 10 is very sensitive to applied strain or stress, it can be considered to be used as flexible switch or other contact mode devices.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A strain sensor for measuring strain of an object greater than 10% of a length of the strain sensor, the sensor comprising:

an upper polydimethylsiloxane (PDMS) substrate having measurement electrodes extending therethrough;

a lower PDMS substrate bonded to a lower surface of the upper PDMS substrate, and an upper surface of the lower PDMS substrate having a patterned portion; and a conductive fluid contained within the patterned portion in contact with the measurement electrodes.

2. The sensor according to claim 1, wherein the conductive fluid is a room temperature ionic liquid for use as a piezoresistive gauge material or a eutectic alloy comprising at least gallium and indium.

3. The sensor according to claim 1, further comprising a casing made from polymers or elastomers.

4. The sensor according to claim 3, wherein the casing is made from PDMS.

5. The sensor according to claim 1, wherein the measurement electrodes are carbon nanotubes doped PDMS.

6. The sensor according to claim 5, wherein the carbon nanotubes are multiwalled.

7. The sensor according to claim 1, wherein the measurement electrodes are lacquered wires or carbon fibers.

8. The sensor according to claim 1, wherein the PDMS substrates are bonded to each other after an oxygen plasma treatment is applied on the PDMS substrates.

9. A method for manufacturing a strain sensor for measuring strain greater than 10% of a length of the strain sensor, the method comprising:

bonding an upper polydimethylsiloxane (PDMS) to a lower PDMS substrate;

injecting a conductive fluid via holes in the upper PDMS substrate to be contained in a patterned portion of the lower PDMS substrate; and filling the holes in the upper PDMS substrate with measurement electrodes that are in contact with the conductive fluid.

10. The method according to claim 9, wherein the conductive fluid is a room temperature ionic liquid.

11. The method according to claim 9, wherein the holes are sealed with carbon nanotube doped PDMS to form the measurement electrodes.

12. The method according to claim 9, wherein lacquered wires or carbon fibers are inserted in the holes to form the measurement electrodes.

13. The method according to claim 9, further comprising the initial step of punching the two holes through the upper PDMS substrate.

14. The method according to claim 9, further comprising the initial step of inserting two metal molds to form the holes of the upper PDMS substrate through which the conductive fluid is injected.

15. The method according to claim 9, further comprising the initial step of patterning the lower PDMS substrate using an SU-8 channel mold to form the patterned portion for containing the conductive fluid.

16. The method according to claim 9, further comprising the initial step of applying an oxygen plasma treatment to the PDMS substrates prior to bonding them together.

17. The sensor according to claim 1, wherein the lower PDMS substrate is patterned via an SU-8 channel mold to thereby form the patterned portion.

18. The sensor according to claim 1, wherein an oxygen plasma treatment is applied to the upper and lower PDMS substrates prior to bonding the lower PDMS substrate to the upper PDMS substrate.

* * * * *